United States Patent
Narayanasamy et al.

(10) Patent No.: US 7,603,546 B2
(45) Date of Patent: Oct. 13, 2009

(54) SYSTEM, METHOD AND APPARATUS FOR DEPENDENCY CHAIN PROCESSING

(75) Inventors: Satish Narayanasamy, La Jolla, CA (US); Hong Wang, Santa Clara, CA (US); John Shen, San Jose, CA (US); Roni Rosner, Binyamina (IL); Yoav Almog, Haifa (IL); Naftali Schwartz, Yaakov (IL); Gerolf Hoflehner, Santa Clara, CA (US); Daniel LaVery, Santa Clara, CA (US); Wei Li, Redwood, CA (US); Xinmin Tian, Union City, CA (US); Milind Girkar, Sunnyvale, CA (US); Perry Wang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 726 days.

(21) Appl. No.: 10/950,693

(22) Filed: Sep. 28, 2004

(65) Prior Publication Data

US 2006/0070047 A1 Mar. 30, 2006

(51) Int. Cl.
*G06F 9/00* (2006.01)
*G06F 9/24* (2006.01)
*G06F 15/177* (2006.01)

(52) U.S. Cl. .......................... 713/1; 717/144; 717/151; 717/159

(58) Field of Classification Search ................. 717/144, 717/151, 159; 713/1
See application file for complete search history.

(56) References Cited

U.S. PATENT DOCUMENTS

| 5,699,537 | A | * | 12/1997 | Sharangpani et al. | 712/217 |
| 6,615,403 | B1 | * | 9/2003 | Muthukumar et al. | 717/160 |
| 6,651,247 | B1 | * | 11/2003 | Srinivasan | 717/161 |
| 6,745,384 | B1 | * | 6/2004 | Biggerstaff | 717/156 |
| 6,941,548 | B2 | * | 9/2005 | Goodwin et al. | 717/151 |
| 7,137,111 | B2 | * | 11/2006 | Damron et al. | 717/159 |
| 2002/0073405 | A1 | * | 6/2002 | Chilimbi | 717/151 |

OTHER PUBLICATIONS

Ferrante, J. et al.: "The Program Dependence Graph and its Use in Optimization", ACM Transactions on Programming Languages and Systems, vol. 9, No. 3, Jul. 1987, pp. 319-349.
Ferrante, J.: "The Program Dependence Graph as a Basis for Node Splitting Transformations", Computer Science Research Report, RC10542, Jun. 7, 1984.
International Search Report dated May 19, 2006 in counterpart foreign application PCT/US2005/032118.

(Continued)

*Primary Examiner*—Kambiz Zand
*Assistant Examiner*—Stephen Sanders
(74) *Attorney, Agent, or Firm*—Caven & Aghevli LLC

(57) ABSTRACT

Embodiments of the present invention provide a method, apparatus and system which may include splitting a dependency chain into a set of reduced-width dependency chains; mapping one or more dependency chains onto one or more clustered dependency chain processors, wherein an issue-width of one or more of the clusters is adapted to accommodate a size of the dependency chains; and/or processing in parallel a plurality of dependency chains of a trace. Other embodiments are described and claimed.

22 Claims, 15 Drawing Sheets

OTHER PUBLICATIONS

Narayanasamy, S. Hong Wang Wang, P. Shen, J. Calder, B. "A Dependency Chain Clustered Microarchitecture" Department of Computer Science and Engineering, University of California, San Diego. Apr. 2005.

International Search Report for application No. PCT/US2005/032118 dated Nov. 17, 2006.

Office Action for Japanese Patent Application No. 2007-533517, mailed Jul. 7, 2009, 6 pages of Office Action and 8 pages of English Translation.

""Examination Guidelines for Patent and Utility Model in Japan"", Part VII, Chapter 1, "Computer Software-Related Invention", Apr. 2005, Web page (Japanese) available at: http://www.jpo.go.jp/shiryou/kijun/kijun2/pdf/tjkijun_vi i-1.pdf, Web page (English) available at: http://www.jpo.go.jp/tetuzuki_e/t_tokkyo_e/Guidelines/7_1 .pdf.

Jeanne Ferrante et al, "The program Dependence Graph and Its Use in Optimization", ACM Transaction on Programming Language and System, United States, Jul. 1987, vol. 9, No. 3, Jul. 1987, 319-349, with abstract and Japanese Office notes, 33 pages total.

* cited by examiner

US 7,603,546 B2

SYSTEM, METHOD AND APPARATUS FOR DEPENDENCY CHAIN PROCESSING

BACKGROUND OF THE INVENTION

Some conventional computers implement a single pipeline-type processor, which executes computer program instructions in a serial order monolithically. In order to maximize the power of parallel processing at instruction level, also known in the art as instruction level parallelism (ILP), such processor may adopt aggressive optimizations in the compiler. Other ways of improving the performance of processors may include implementing out-of-order pipeline processors that may execute instructions in a non-serial order. However, such implementations may have disadvantages of increased complexity both in hardware and in software. Another option is to design processors that may operate at higher frequencies, but this can adversely cause increase in latency for accessing cache/memory, and/or can reduce the processing efficiency, which may be measured, for example, by instructions per cycle (IPC).

There has been recent research relating to clustering processor resources to design complexity efficient micro-architectures. According to one research, instead of using a monolithic pipeline, it has been suggested to use multiple clusters, wherein each cluster may have a lower complexity than a single monolithic pipeline. According to this research, computer program instructions may be dispatched to different clusters during execution with the objective of minimizing inter-cluster communication to reduce latency. According to another research, it has been suggested that dependency chain based execution that utilizes inter-instruction dependency relations may alleviate the complexity of the processor design.

BRIEF DESCRIPTION OF THE DRAWINGS

The invention will be understood and appreciated more fully from the following detailed description of embodiments of the invention, taken in conjunction with the accompanying drawings of which.

DETAILED DESCRIPTION OF EMBODIMENTS OF THE INVENTION

Figure 1:
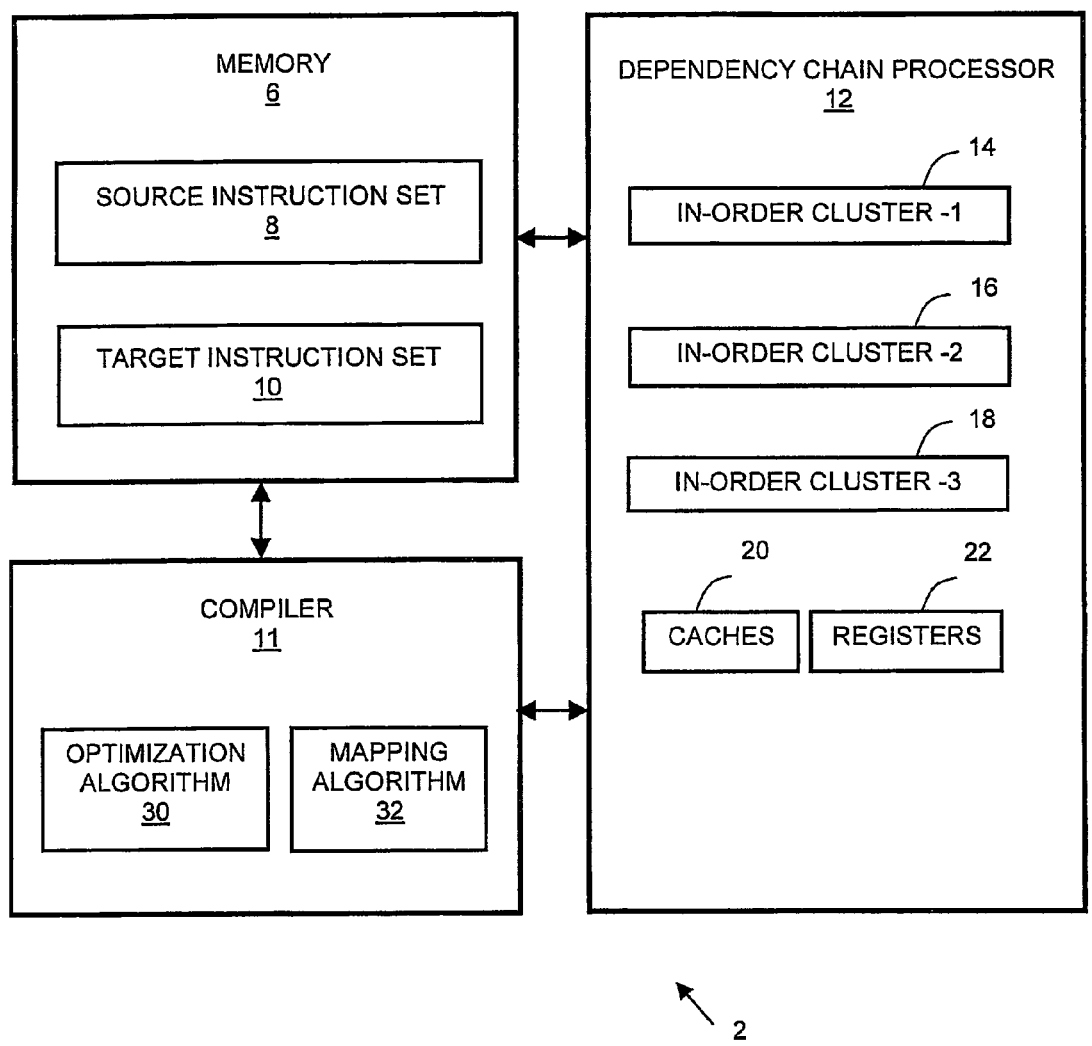
FIG. 1 is a block diagram illustration of an apparatus capable of compiling source instructions into target instructions, and executing target instructions using a clustered dependency chain processor (DCP), according to some exemplary embodiments of invention.

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods and procedures have not been described in detail so as not to obscure the embodiments of the invention.

Some portions of the detailed description in the following are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Some embodiments of the invention may be implemented, for example, using a machine-readable medium or article which may store an instruction or a set of instructions that, if executed by a machine, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, e.g., memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Embodiments of the invention may include apparatuses for performing the operations herein. This apparatus may be specially constructed for the desired purposes, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the invention are not described with reference to any particular programming language. It will be appreciated that a variety of programming languages may be used to implement the teachings of the invention as described herein.

In the following description, various figures, diagrams, flowcharts, models, and descriptions are presented as different means to effectively convey the substances and illustrate different embodiments of the invention that are proposed in this application. It shall be understood by those skilled in the art that they are provided merely as exemplary samples, and shall not be constructed as limitation to the invention.

FIG. 1 is a block diagram illustrating an apparatus 2, for example, a computing platform, including a memory 6, operatively connected to a clustered dependency chain processor (DCP) 12, according to exemplary embodiments of the invention. Memory 6 may be capable of storing at least a source instruction set 8, e.g., source code, and a target instruction set 10, e.g., a binary executable code suitable for DCP 12. Apparatus 2 may further include a compiler 11, which may include an optimization algorithm 30 and a mapping algorithm 32, according to exemplary embodiments of the invention as described in detail below. The source instruction set 8 may be compiled into the target instruction set 10, for example, by the compiler 11, which may include, for example, a dynamic translator, a binary instrumentation tool, using either online or offline compilation. Target instruction set 10 may include traces, which may be referred to as dependency chain (DC) traces ("DC-traces"), which may be constructed in accordance with the micro-architecture of DCP 12. The DC-traces used in DCP 12 may be relatively long traces, e.g., having hundreds of instructions. Such long traces, which may be constructed by offline compilation methods as described in detail below, are significantly longer than traces used by conventional trace processors. Conventional trace processors use hardware to construct traces during execution and, due to a limited instruction window in the hardware, the length of traces thus constructed is generally short, e.g., 16 to 32 instructions per trace. Long traces may enhance instruction level parallelism (ILP) through aggressive trace scheduling, according to embodiments of the invention.

A DC-trace may contain one or more dependency chains (DCs). As is known in the art, a dependency chain (DC) is a maximally connected component in the graphical representation of data dependency in a DC-trace. According to embodiments of the invention, DCs inside the DC-traces of target instruction set 10 may be subjected to an optimization algorithm 30 to produce a set of DCs with reduced width. The optimized DCs may be mapped onto a set of clusters in DCP 12, for example, clusters 14, 16, and 18, based on a mapping algorithm 32.

According to exemplary embodiments of the invention, DCP 12 may have clustered processors constructed in accordance with a desired trace-based execution model. The clusters in the DCP, for example, clusters 14, 16, and/or 18, may be super-scalar in-order or out-of-order pipelines, and may have different issue widths to form a heterogeneous DCP, or may have the same issue width to form a homogeneous DCP. DCP micro-architecture 12 may further include caches 20 and registers 22.

Figure 2:
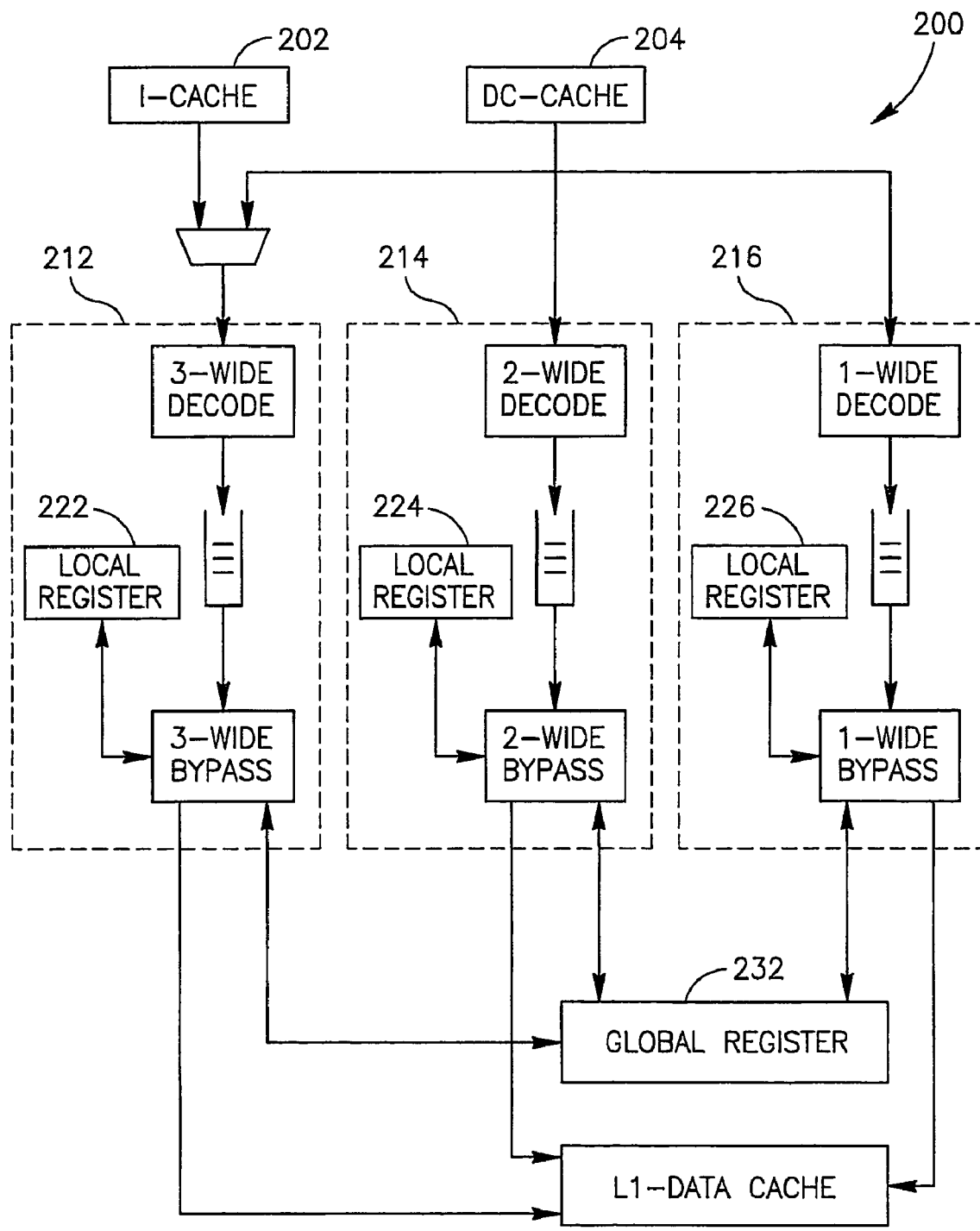
FIG. 2 is a block diagram illustration of a clustered DCP configured to have three pipeline clusters, of sizes 3-wide, 2-wide, and 1-wide, respectively, according to some exemplary embodiments of the invention.

FIG. 2 is a block diagram illustrating a micro-architecture of heterogeneous clustered DCP 200 configured to have three processing paths, e.g., in-order pipeline clusters, of sizes 3-wide, 2-wide, and 1-wide, respectively, according to exemplary embodiments of the invention. DCP 200 may operate in two distinctive modes of operation, namely, a DC-mode, e.g., to execute "hot" paths, and a non-DC-mode, e.g., to execute "cold" paths. Both "hot" paths and "cold" paths may be contained in the target instruction set 10 (FIG. 1), which may include binary executable code.

In a computer program, "hot" paths are program paths that make up a relatively small portion, e.g., 10-20%, of the static program instructions, but may be executed relatively frequently and are responsible for a relatively large portion, e.g., 80-90%, of the over-all computation in terms of dynamically executed instructions. "Cold" paths are those program paths that make up a relatively large portion, e.g., 80-90%, of the static program instructions, but are executed relatively infrequently and are responsible for a relatively small portion, e.g., 10-20%, of the total computation in terms of dynamically executed instructions. According to some exemplary embodiments of the invention, DC-traces constructed for the microarchitecture of DCP 12 may represent "hot" paths of a program.

In the non-DC mode of operation, DCP 200 may fetch computer program instructions sequentially from an instruction cache (I-Cache) 202. One or more of the fetched instructions may be issued in the order in which they are received to one of the processing paths, e.g., the widest processing path of cluster 212 in DCP 200. The remaining processing paths, e.g., a cluster 214 and a cluster 216, may be left unutilized during non-DC mode of operation of DCP 200. According to some exemplary embodiments of the invention, DCP 200 may be switched from the non-DC-mode of operation to the DC-mode of operation, e.g., in the course of instruction execution. For example, it is known in the art that a trace predictor (not shown) may be used to predict that a trace may soon be executed. The trace predictor may be implemented to switch DCP 200 from the non-DC-mode of operation to the DC-mode of operation when a trace is predicted.

In the DC mode operation, instructions may be fetched from a dependency chain trace cache (DC-Cache) 204 instead of from I-Cache 202. Dependency chains (DCs) may then be directed to appropriate processing paths, for example, clusters 212, 214, and 216 as in FIG. 2, according to a pre-defined scheme of assignment. The pre-assignment may be carried out during a DC-to-cluster mapping process, as explained below in more detail.

DCs in a trace are inherently independent of each other so that there is no data dependency between DCs within the same trace. When DCs of the trace are issued to different clusters, for example, clusters 212, 214, and/or 216, one DC may be executed independently within a cluster without referring to other DCs in other clusters. Therefore, multiple DCs may be executed in parallel at different rates within different clusters, respectively. For example, a DC within cluster 212 may be executed ahead of DCs within either cluster 214 or cluster 216.

According to exemplary embodiments of the invention, DCP 200 of FIG. 2 may employ a two-level hierarchical structure of registers. One or more clusters in the architecture may have one local register of its own, which may be, for example, an 8-entry register, e.g., register 222, 224 or 226. In addition, there may be a global register 232 that may be accessible by one or more of the clusters. Intermediate values during execution of a DC inside a cluster may be written to, and/or read from, the local register of the cluster. The global register may be shared by one or more of the clusters, and may be used for reading and/or writing data produced and/or used by adjacent traces.

Because DCs concurrently executed in different clusters may be issued from the same trace, they may be completely data independent of each other, and there may be no need to communicate values between such DCs, or between their respective clusters. DCP 200 may be insensitive to delays in the response of global register 232. According to exemplary embodiments of the invention, global register 232 may be implemented using any suitable type of storage, or other data storing media, for example, on-chip level-1 (L-1) data cache memory (FIG. 2). In such implementation, the read and write to register 232 become explicit load and store operations.

According to some embodiments of the invention, DCP 200 may use on-chip storage, to store a checkpoint copy of the values of global register 232, to be used, for example, in situations where re-execution of a particular DC-trace becomes necessary. Re-execution may become necessary, for example, due to an exception when a trace is being executed in the DC mode of operation or a mis-prediction of a DC-trace. DCP 200 may then switch back to the non-DC mode and start re-executing instructions from the beginning of the last issued trace, using values from the checkpoint copy of global register 232, which may be saved in the memory. In such cases, additional load and/or store instructions may be implemented in order to handle communications between DCP 200 and the memory, e.g., L-1 data cache (FIG. 2).

Figure 3:
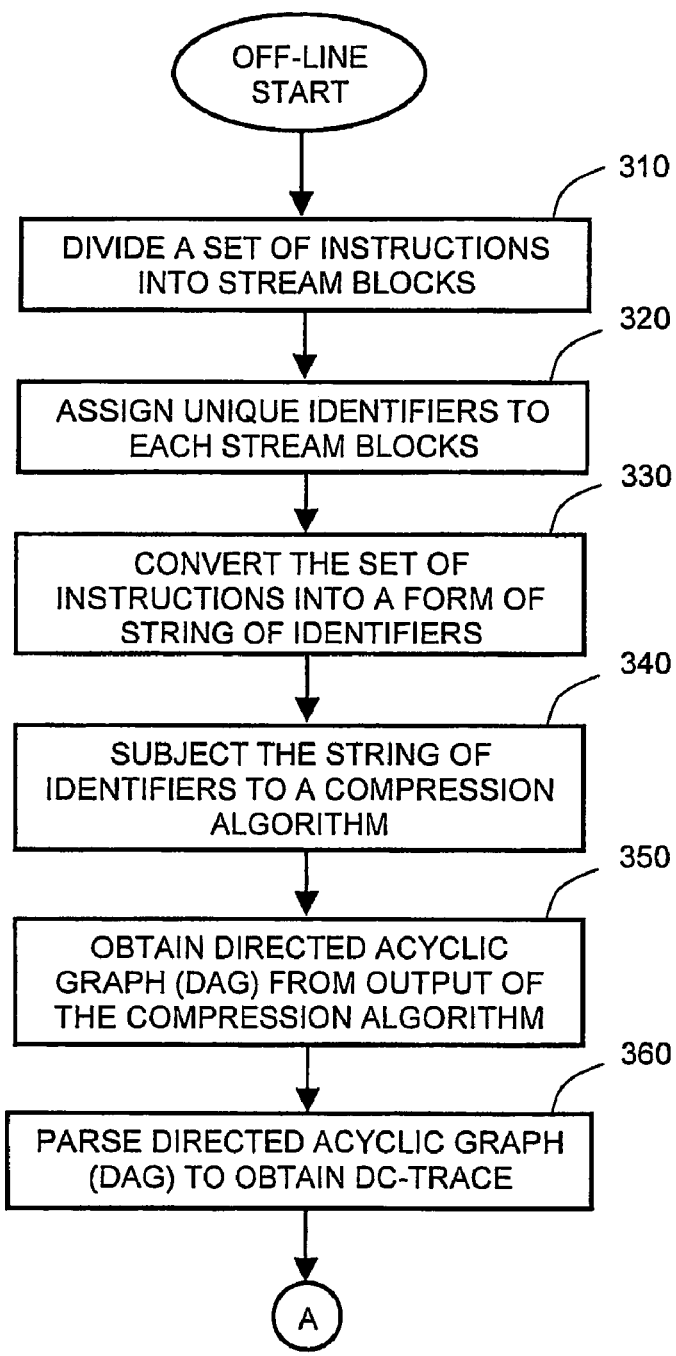
FIG. 3 is a schematic flowchart of a method of constructing dependency chain (DC) traces for use in conjunction with a clustered DCP, according to some exemplary embodiments of the invention.

FIG. 3 is a schematic flowchart illustrating a method for constructing long DC-traces according to exemplary embodiments of the invention. The construction of long DC-traces may be based on an enhanced Whole Program Path (WPP) approach, as is known in the art, or any other suitable method, and may be performed either online or offline, e.g., for longer traces.

A compiler, e.g., compiler 11 (FIG. 1), may run on a processor, e.g., DCP 12 (FIG. 1), to construct a DC-trace. In alternate embodiments of the invention, compiler 11 may run on any suitable type of processor, e.g., a dedicated processor or a general-purpose processor, in accordance with specific implementations and/or design requirements. The DC-trace may be constructed by collecting an instruction execution profile and dividing the instruction execution profile into stream blocks, as indicated at block 310. A stream block in the context of this application may refer to a sequence of instructions between taken branches of a computer program. Each unique stream block may be represented by a sequence of instruction addresses for all instructions in the stream block. An aggregate of one or more stream blocks may then be assigned with a unique stream identifier, as indicated at block 320. The original instruction execution trace may be converted into a string of stream identifiers, as indicated at block 330.

As indicated at block 340, the string of stream identifiers created as described above may then be subjected to a compression algorithm, e.g., a Sequitur compression algorithm as is known in the art. The Sequitur algorithm may produce a compact representation for a given input string of stream identifiers, e.g., by representing the string in the form of context free grammar. The algorithm may replace sequences of stream identifiers and grammar rules that are repeated more than once with a single grammar rule. A resulting grammar representation of the string of stream identifiers, created by the compression algorithm, may be a directed acyclic graph (DAG) (block 350). One or more frequently recurrent sequences of stream identifiers may then be identified and extracted by parsing the DAG (block 360). A recurrent sequence of stream identifiers may effectively correspond to a concatenated sequence of instructions. This unique recurrent sequence of instructions may be referred to as a DC-trace, from which instruction dependency chains may be further extracted.

Figure 4:
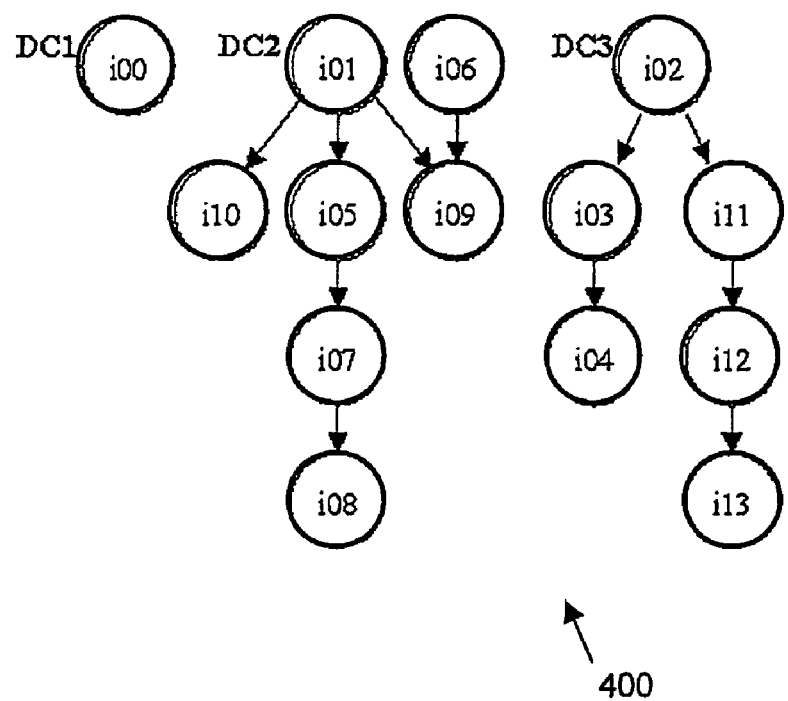
FIG. 4 is a conceptual illustration of three dependency chains in a DC-trace, according to some exemplary embodiments of the invention.

The instruction data dependency in a DC-trace may be graphically represented as a set of independent dependency chains (DCs). A graphical representation of the set of dependency chains in the trace is referred to herein as a data dependency graph (DDG). FIG. 4 is a diagram illustration of an exemplary sample of DDG 400, which includes three DCs, namely, DC1, DC2, and DC3. A corresponding sample DC-trace, which may be obtained by parsing the DDG in FIG. 4, is shown in the following Table 1. The DC-trace may be represented by a consecutive sequence of identifiers in conjunction with a set of corresponding grammar rules.

TABLE 1

| I00,      | st8           | [r6] = r3        |
|-----------|---------------|------------------|
| I01,      | adds          | r6 = 04h, r6     |
| I02,      | adds          | r7 = 01h, r7     |
| I03,      | cmp4.lt.unc   | p9, p8 = 32h, r7 |
| I04, (p8) | br.cond.dpnt.few | b0 = $+0×42b3a8 |
| I05,      | ldB           | r5 = [r6]        |
| I06,      | adds          | r3 = 0, r0       |
| I07,      | cmp4.lt.unc   | p9, p8 = r5, r4  |
| I08, (p8) | br.cond.dpnt.few | b0 = $+0×42b3d0 |
| I09,      | st8           | [r6] = r3        |
| I10,      | adds          | r6 = 04h, r6     |
| I11,      | adds          | r7 = 01h, r7     |
| I12,      | cmp4.lt.unc   | p9, p8 = 32h, r7 |
| I13, (p8) | br.cond.dpnt.few | b0 = $+0×42b3a8 |

Figure 5:
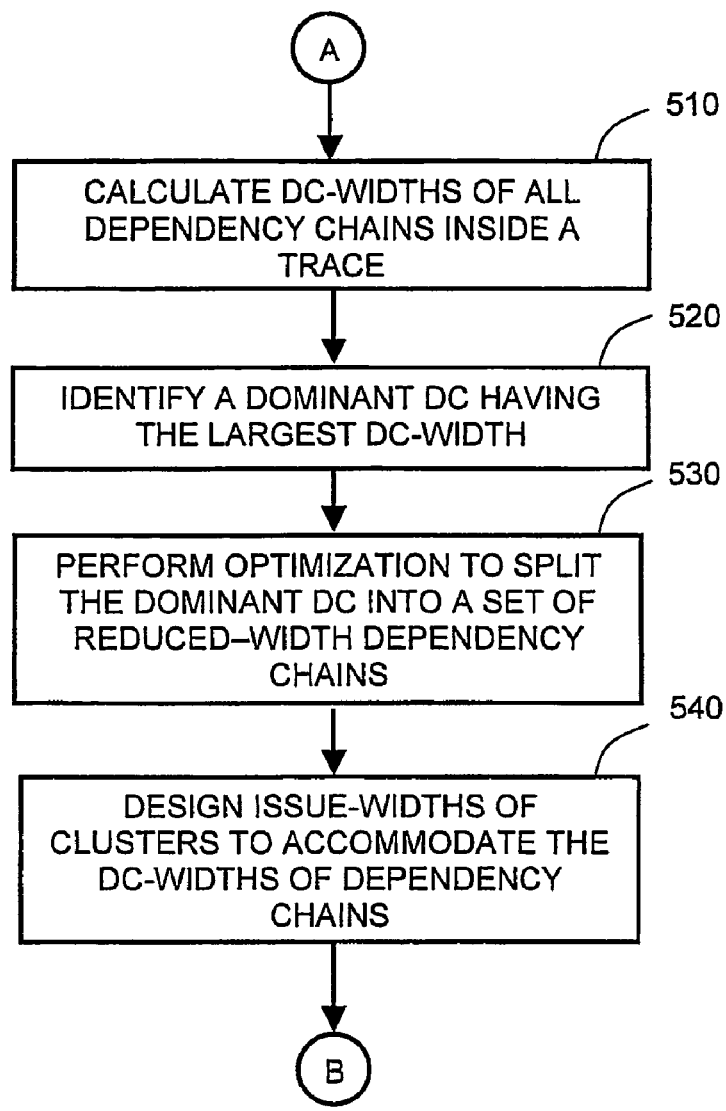
FIG. 5 is a schematic flowchart of a method of analyzing dependency chains and designing cluster issue widths according to some exemplary embodiments of the invention.

FIG. 5 is a block diagram illustrating a method of analyzing a DDG and constructing DCs for clusters with properly selected issue widths, according to exemplary embodiments of the invention. It will be appreciated that an important topology specific property of a DC is a metric known as "DC-width". The DC-width may be measured, for example, as the number of total instructions within a DC divided by the longest path length in the graphical representation of data dependency of the DC. According to exemplary embodiments of the invention, a processor may implement the DC analysis method by calculating the values of DC-widths of one or more of the DCs inside a DC-trace (block 510), and then identifying the relative dominance of the DCs, according to the number of instructions and/or DC-widths of the DCs (block 520). A DC having the largest DC-width may also have the largest number of instructions, and therefore may be a dominant DC. Accordingly, a DC that has the largest DC-width may be the most dominant DC, or first dominant DC ("the dominant DC"). A DC that has a second largest DC-width may be referred to as the second dominant DC, and so on. In the example shown in FIG. 4, DC2 has the largest DC-width and is therefore the dominant DC, while DC3 is the second dominant DC.

In DCP 12 (FIG. 1), all the instructions within a particular DC may be executed within a single cluster. Therefore, the largest DC-width of all the DCs may represent a metric for the minimum issue width required of a cluster in order to maximize available instruction level parallelism (ILP). According to exemplary embodiments of the invention, a DC optimization algorithm may be applied to the dominant DC so as to create a set of new dominant DCs that may have narrower DC-widths than the original DC (block 530). By applying the DC optimization algorithm iteratively to the resultant dominant DC, this may result in a more efficient design of clusters by virtue of a lower constraint on the maximum issue width of clusters (block 540).

According to some exemplary embodiments of the invention, it may also be advantageous to design a heterogeneous cluster structure, e.g., having only one wide cluster for the first dominant DC, and a number of narrower clusters for the remaining DCs. A heterogeneous cluster configuration may require less area than a homogeneous cluster configuration, for example, because a heterogeneous cluster configuration may use smaller bypass network logic.

Figure 6:
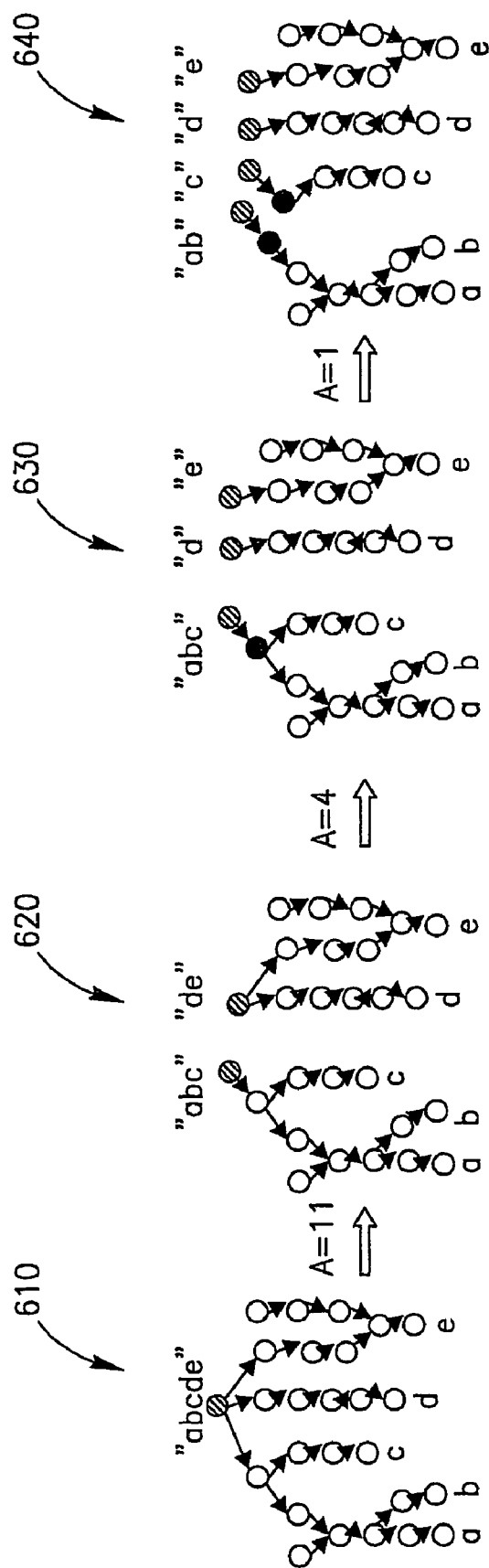
FIG. 6 is a conceptual illustration of splitting a dependency chain into a set of reduced-width dependency chains according to some exemplary embodiments of the invention.

FIG. 6 is a conceptual block diagram illustrating a DC optimization algorithm based on an instruction duplication procedure according to exemplary embodiments of the invention. The instruction duplication algorithm starts at a dependency chain shown in FIG. 6 as "abcde" (610).

An advantage number of a split may be defined as the number of real instructions, represented by the smaller instruction set of the two resultant instruction sets as a result of the split that are not duplicated in the other instruction set, subtracted by the number of duplicated instructions found in both instruction sets. Instructions of a dominant DC "abcde" may be split into two smaller sets of instructions, denoted as DC "abc" and DC "de", e.g., based on a calculated index value, e.g., a calculated advantage number eleven (620). As is illustrated in FIG. 6, when instruction set "abcde" is split into two smaller sets, "abc" and "de", the set "abc", which is the smaller of "abc" and "de", has twelve real instructions as indicated by the empty circles. The two instruction sets, "abc" and "de", have one duplicated instruction as indicated by the solid circle. Therefore, the calculation yields an advantage number of eleven.

The next dominant DC, e.g., DC "de", may then be split, e.g., into DC "d" and DC "e" (630), based on an advantage number of four associated with the splitting. Similarly, DC "abc" may be split into DC "ab" and DC "c", for an advantage number of one (640). It will be appreciated that, in this example, no further optimization may be necessary on DC "ab" because the advantage number associated with the splitting of DC "ab" is negative, indicating that a split would require a large number of instruction to be duplicated, and would therefore be inefficient. Although the above exemplary embodiment relates to splitting a DC based on a calculated advantage number, according to other embodiments of the invention the DC may be split based on any other calculated index value.

Figure 7:
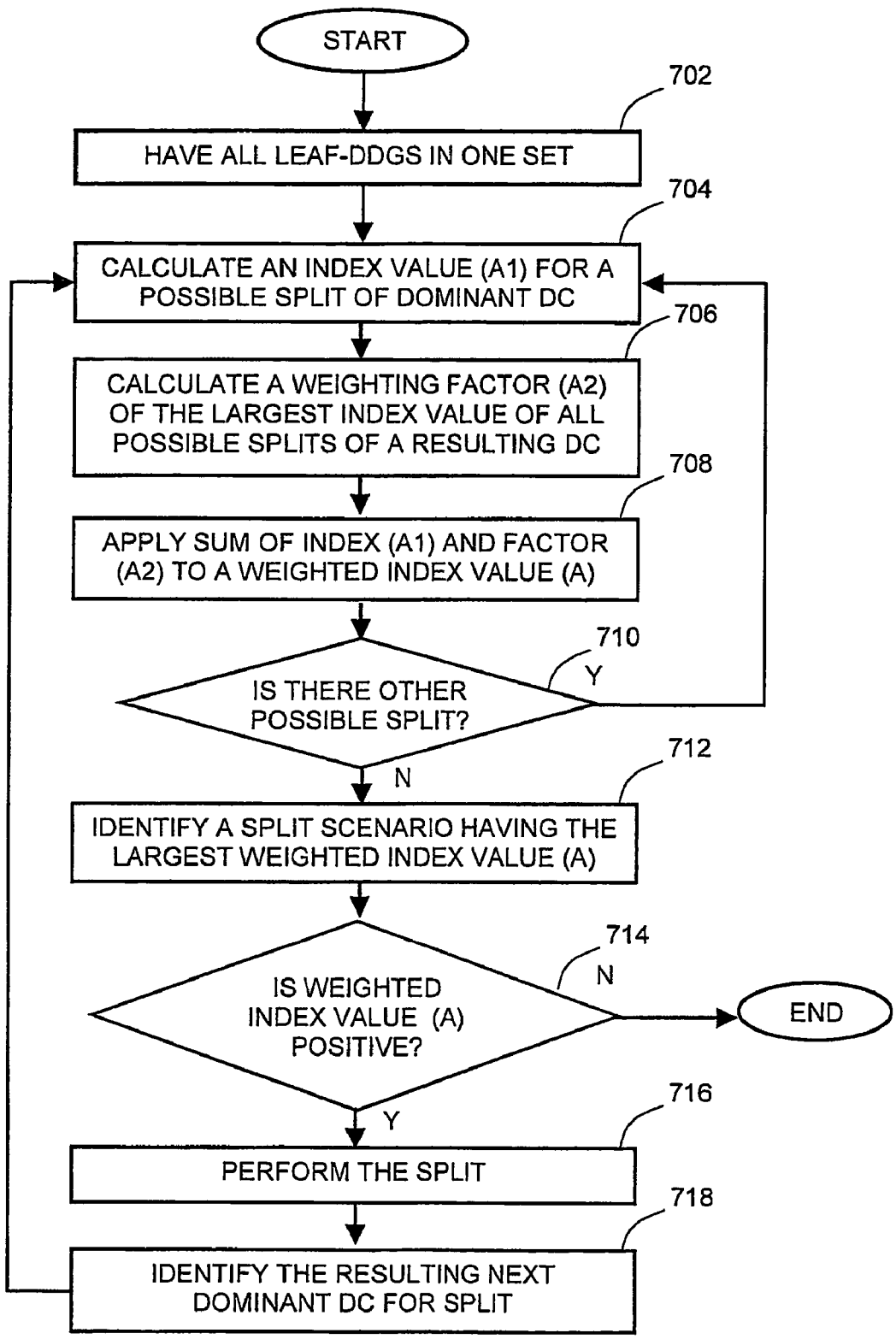
FIG. 7 is a schematic flowchart of a method of performing dependency chain optimization according to some exemplary embodiments of the invention.

FIG. 7 is a schematic flowchart further explaining an enhanced DC optimization process, which may be executed, for example, by processor 12 (FIG. 1), according to exemplary embodiments of the invention, as conceptually illustrated in FIG. 6. The optimization algorithm, namely, an instruction duplication algorithm, may be designed to achieve the goal that, after optimization, the resulting largest DC would be as small as possible, yet the number of duplicated instructions during the process would be reduced, e.g., kept to a minimum. In other words, the optimization process may be understood as a process of splitting DCs into optimal grouping of Leaf-DDGs.

A leaf instruction may include a subset of instructions of a DC. A Leaf-DDG (LDDG) of a leaf instruction in a DC may include a subset of instructions in that DC that is necessary to produce the input values to execute that leaf instruction. The set of LDDGs is the maximum possible split for a given DC. For example, as is shown in FIG. 6, "a", "b", "c", "d", and "e" are the LDDGs of the five leaves of the original DC "abcde", representing a maximum possible split. However, as is explained in FIG. 6, performing a maximum possible split may, in some cases, result in a large number of duplication instructions.

According to exemplary embodiments of the invention, the instruction duplication algorithm may start with the grouping of all the LDDGs into one set (702). A potential split, among a plurality of splitting scenarios, may be selected and an index value, A1, e.g., an advantage number, related with this split may be calculated (704).

The algorithm may continue to calculate a "weighting factor", A2. A2 may be the largest one of all the index values associated with splitting a resulting dominant DC (706). This resulting dominant DC may be a direct result of the splitting of a DC that is considered for splitting in the preceding operation (704). The two values, e.g., index value A1 as in operation 704 and weighting factor A2 as in operation (706) are subsequently added together to produce a combined value A, referred herein as "weighted index value" (708).

The splitting process described above may require an evaluation of all the possible splits. Therefore, according to some embodiments of the invention, as long as there are other possible splits that need to be evaluated (710), the method may repeat operations 704, 706 and 708, until the combined value A is evaluated for all possible split scenarios.

The method may proceed, e.g., once the evaluation of at least some of the possible splits is complete, to identifying a splitting scenario that is related to the largest weighted index value A (712). In addition, the method may include checking whether the weighted index value A is bigger than a pre-defined value, e.g., zero (714). As indicated at block 716, the method may include splitting the DC according to the identified splitting scenario, e.g., if the weighted index value is determined to be bigger than the pre-defined value. The method may also include identifying a new dominant DC having the widest issue-width, resulting from the immediate split (718). The method may also include repeating the splitting algorithm (704).

The weighted index value A may be smaller than the pre-defined value, e.g., zero (714), for example, after one or more iterations. This may indicate that more instructions would need to be duplicated than a possible reduction of instructions in the DC by virtue of a split. Thus, the splitting process is terminated.

Figure 8:
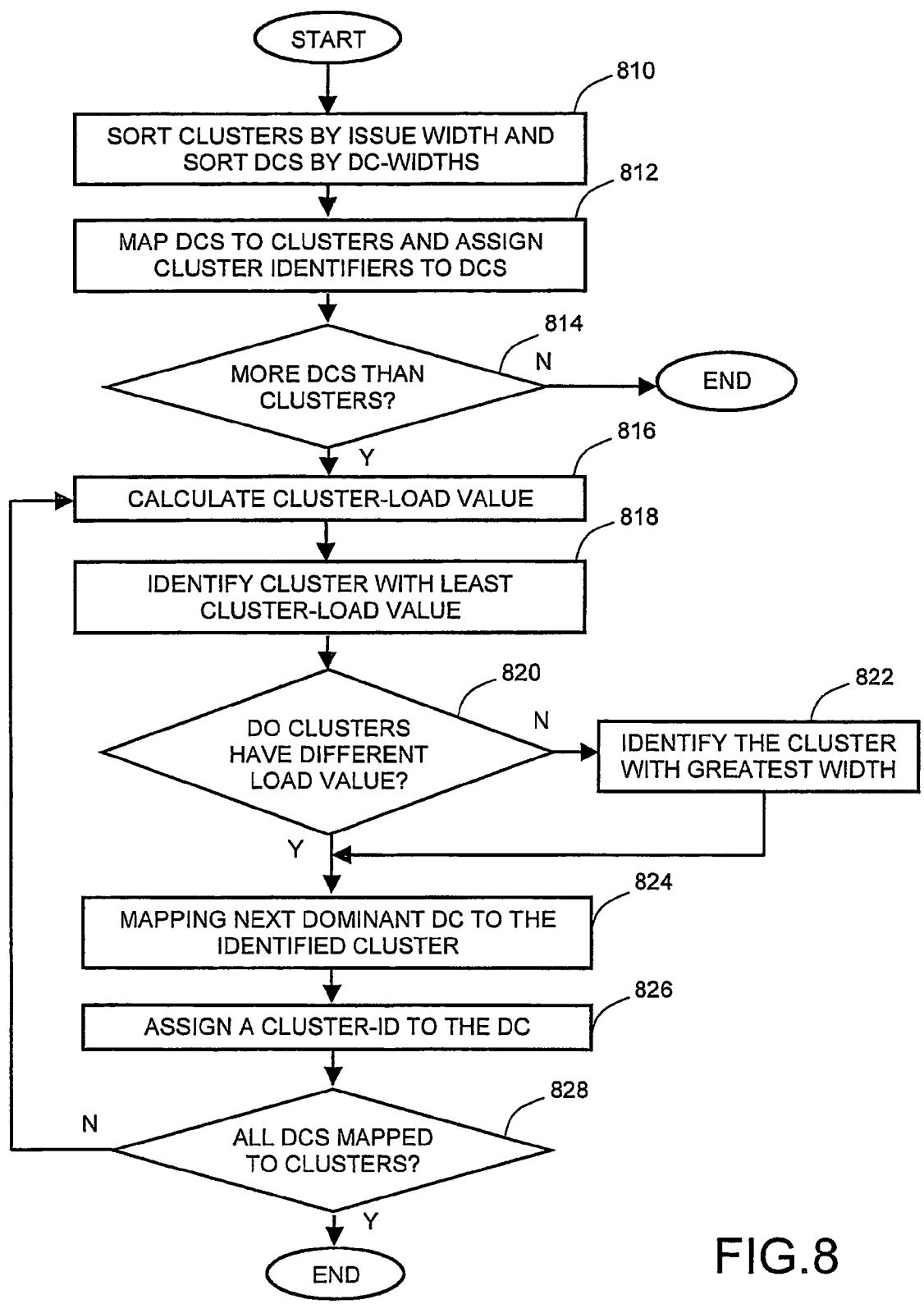
FIG. 8 is a schematic flowchart of a method of mapping dependency chains onto clusters according to some exemplary embodiments of the invention.

FIG. 8 is a schematic flowchart of a method for mapping DCs to clusters, according to exemplary embodiments of the invention. DCs may be sorted according to their dominance, e.g., starting from the most dominant DC, and clusters may be sorted by their issue-width, e.g., starting from the widest cluster (810). The DCs may then be mapped, e.g., one by one, onto corresponding clusters in order (812). In other words, the most dominant DC may be mapped onto the widest cluster, and the second dominant DC may be mapped onto the second widest cluster, etc., until either all the DCs are mapped onto respective clusters or all the clusters are used up in the mapping process. One or more mapped DC may be assigned with an identifier (ID), identifying the cluster onto which the DC is mapped.

The mapping process may then proceed to check whether there are remaining DCs to be mapped (814). The mapping process may end, e.g., if all the DCs have been mapped. At least some of the clusters may be mapped with more than one DC, and the mapping process may proceed as follows, e.g., if there are still DCs to be mapped.

According to some exemplary embodiments of the invention, a cluster-load value may be used to map the remaining DCs. The cluster-load value of a cluster may be defined as the total number of instructions already mapped to the cluster divided by the issue-width of the cluster. Cluster-load values for one or more of the clusters may be calculated (816). A cluster may then be selected based on predetermined criteria. For example, a cluster that has the lowest cluster-load value may be selected (818). In some cases, there may be two or more clusters with the same cluster-load value (820). In such cases, the cluster with greatest issue width (822) of the clusters with the same cluster-load value may be selected. The mapping process may then map the next dominant DC to the selected cluster (824).

After mapping of a DC to a cluster, the DC being mapped may be assigned with an identifier (ID) that may uniquely identify the cluster onto which the DC is mapped (826). As described above, during execution of DC-traces in the DCP, e.g., DCP 12 (FIG. 1), a DC in the trace may be allocated to a cluster for execution, for example, based upon this pre-defined scheme, e.g., pre-assigned cluster-ID.

After mapping a DC to a cluster and assigning a cluster ID to the DC (826), the mapping process may further determine whether all the DCs have been mapped to the clusters (828). If there are still DCs left to be mapped, the process may return back to calculating cluster-load values of the newly updated clusters (816). The next dominant DC may then be mapped onto a cluster selected, e.g., following the procedure as described above. This process may continue, for example, until all the DCs are mapped to clusters.

In conjunction with various embodiments of the invention as disclosed in this application, various benchmark analyses have been conducted to provide quantitative supporting base to the various embodiments of the invention. The exemplary results of these analyses are summarized in the following sections. The benchmarks that were used include eight integer benchmarks selected from the CINT2000 suite, e.g., "bzip2", "crafty", "gap", "gcc", "gzip", "mcf", "twolf", and "vpr", as denoted in the following graphs. The binary codes used in this work were compiled with the Intel® Electron compiler for the Itanium architecture, according to some exemplary embodiments of the invention. This advanced compiler incorporates state-of-the-art optimization techniques known in the compiler community as well as techniques specifically designed for the features of the Intel® Itanium Processor Family (IPF) architecture. All benchmarks were compiled with maximum compiler optimization enabled. The optimization includes those based on profile-driven feedback-guided, such as aggressive software prefetching, software pipelining, control speculation and data speculation, as are known in the art.

Figure 9:
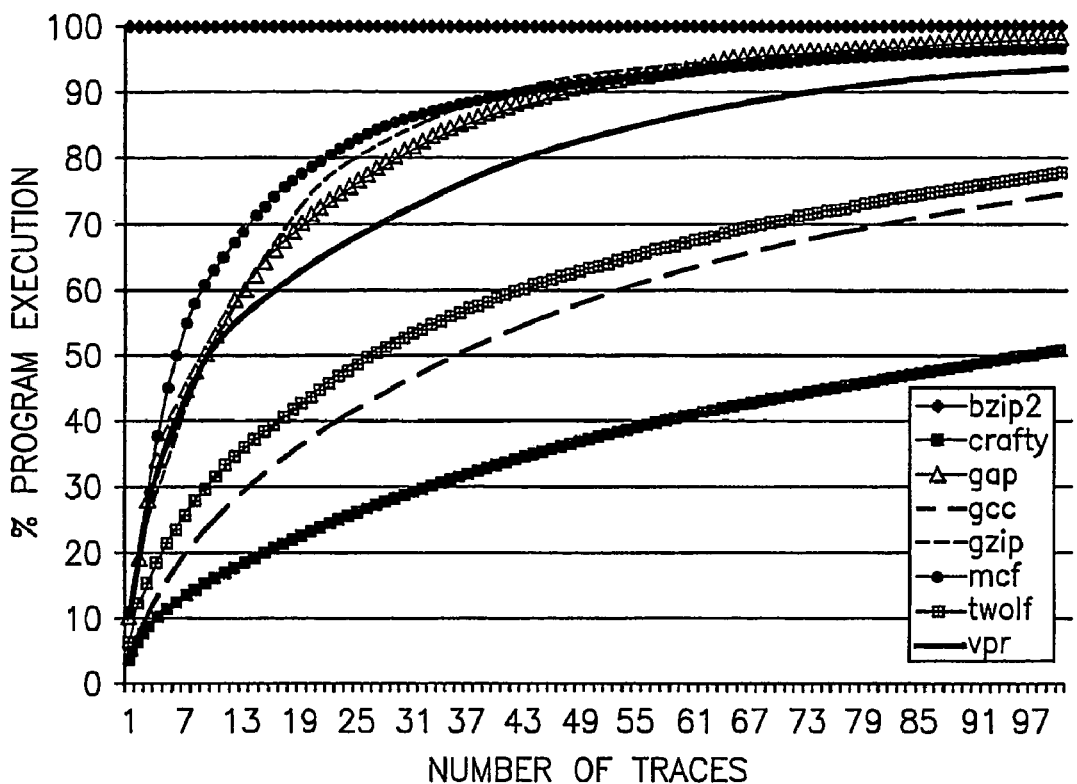
FIG. 9 is a schematic illustration of a graph showing the cumulative percentage of program instructions executed by traces captured using an enhanced Whole Program Path (WPP) approach.

FIG. 9 is a schematic graph showing the cumulative percentage of instructions executed by traces captured by using an enhanced Whole Program Path (WPP) approach. It shows the 100 most frequently executed traces by the eight benchmark programs listed above. The x-axis shows the number of traces and the y-axis depicts the cumulative percentage of program coverage of those traces. It is clear that fewer than 100 traces are necessary to cover up to 80% of dynamically executed instructions for all programs, except one that has a larger program footprint.

Figure 10:
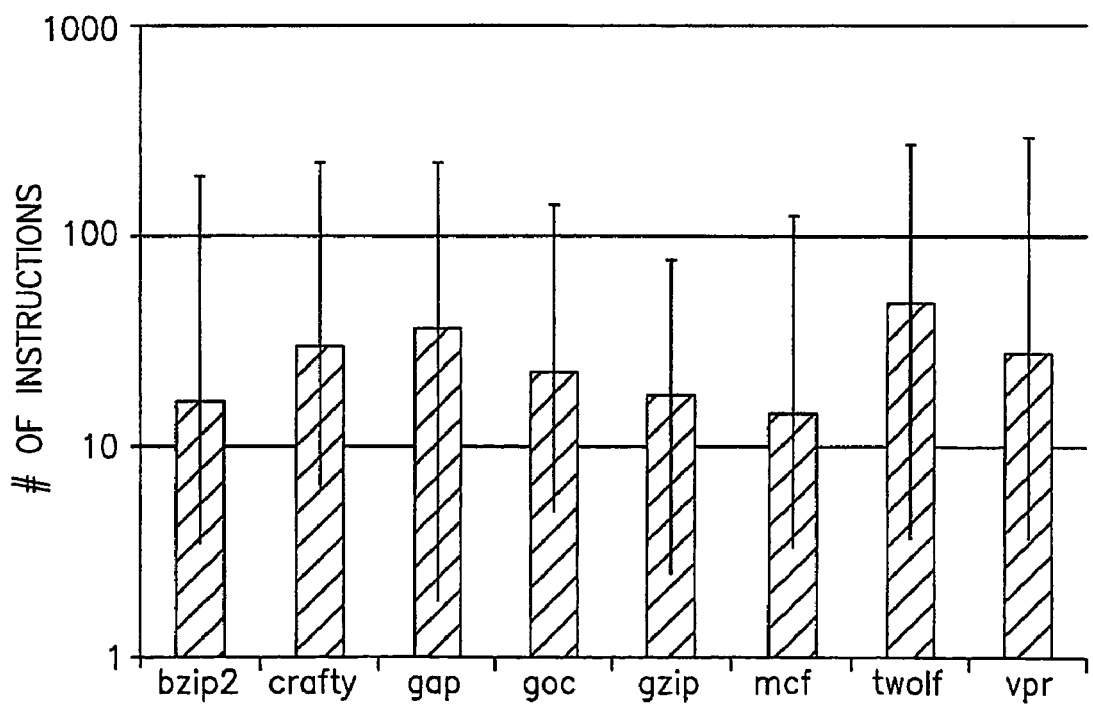
FIG. 10 is a schematic illustration of a graph showing the average number of instructions in one trace formed by using an enhanced WPP approach.

FIG. 10 is a schematic graph showing the average number of instructions in the traces constructed, as well as the maximum and minimum trace lengths, indicated by the vertical line on top of each bar, for the traces constructed for each benchmark shown in the x-axis. It is noted that the y-axis is in logarithmic scale. The offline compilation, according to exemplary embodiments of the invention, based on the WPP algorithm may be capable of constructing significantly longer traces than those built in other approaches for trace-based processor. These long traces, as may be used, for example, in DCP 12 (FIG. 1), may enable performing better instruction scheduling for in-order clusters.

Figure 11:
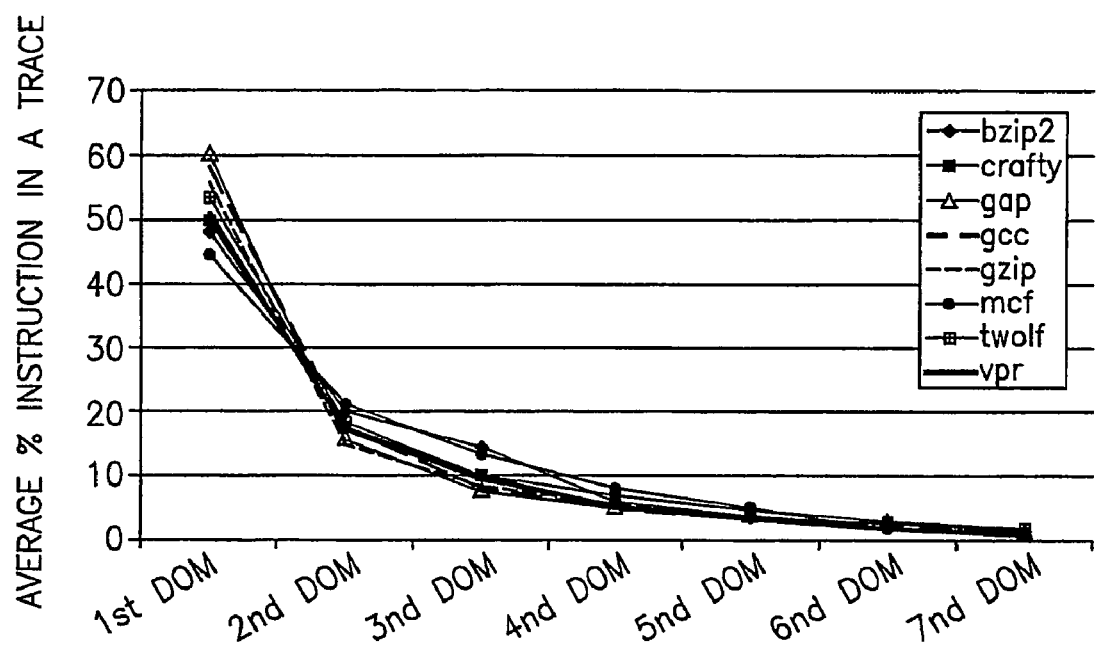
FIG. 11 is a schematic illustration of a graph showing the average percentage of program instructions distributed among seven most dominant DCs in a trace.

FIG. 11 is a schematic graph showing the average percentage of program instructions distributed among the seven most dominant DCs for the benchmarks studied. It shows that the first dominant DCs in any traces contain a large number of instructions when compared to other DCs. The first dominant DCs account for nearly 50%-60% of all the instructions in the traces while the second dominant DCs account for only about 20% of instructions in the traces and the rest of the DCs account for fewer than 10%.

Figure 12:
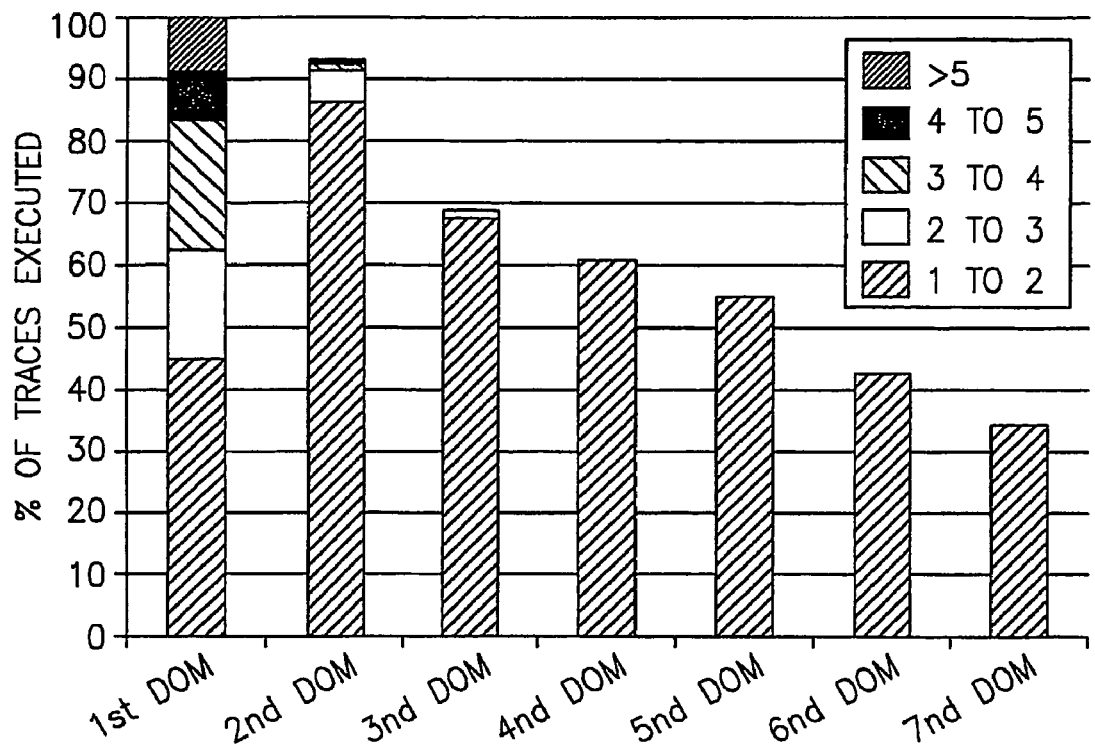
FIG. 12 is a schematic illustration of a graph showing the percentage of traces distributed among DC-widths of seven most dominant DCs.

FIG. 12 is a schematic graph showing the percentage of traces distributed among DC-widths for the seven most dominant DCs, averaged across traces from all the benchmarks described above. Since for some traces, from the second dominant DC and onwards, the DCs may not exist at all, the bars for those DCs do not add up to 100%. In close to 55% of traces executed, the first dominant DCs have a DC-width greater than two. In other words, in close to 45% of traces executed, the DC-width is less than two. Also, DC-width tend to be greater than three only for the first dominant DCs but for others it is rarely greater than two. This implies that when designing a clustered micro-architecture, issue widths of the clusters may not need to be uniform. It is possible, for example, to maximize the available instruction level parallelism (ILP) by designing a heterogeneous clustered micro-architecture, with only one wide cluster catered to the needs of the first dominant DCs and a number of narrower clusters, possibly 1-wide, as is discussed above with reference to FIG. 5.

Figure 13:
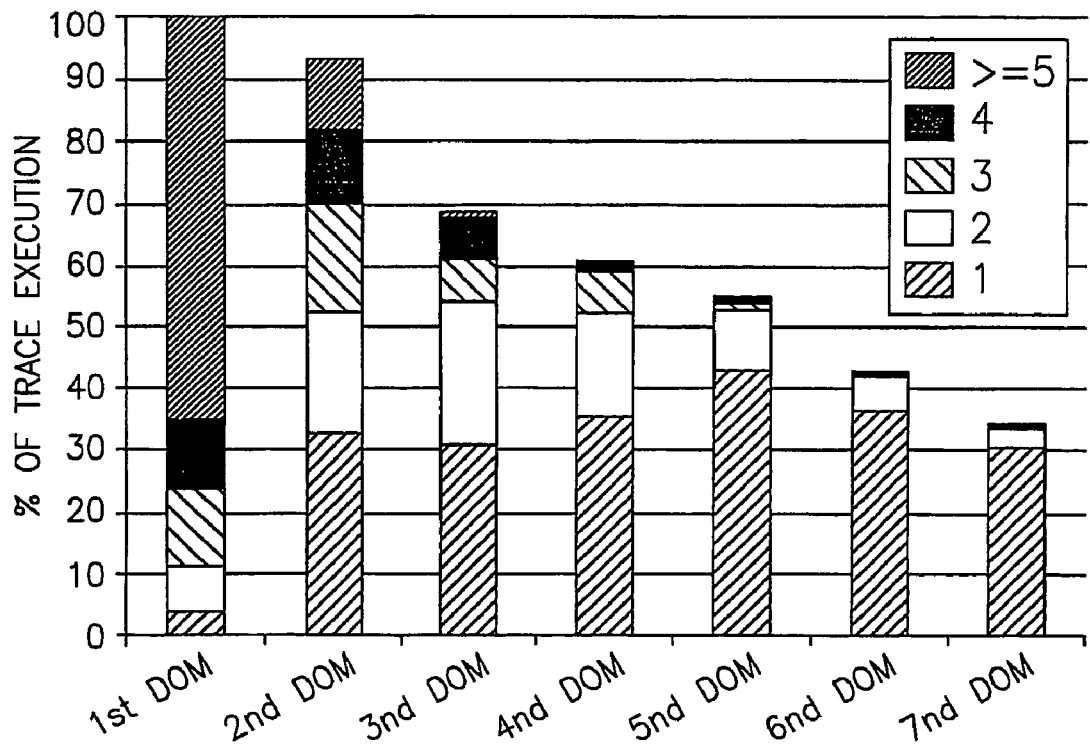
FIG. 13 is a schematic illustration of a graph showing the percentage of traces distributed among critical path lengths of seven most dominant DCs.

FIG. 13 is a schematic graph showing the percentage of traces distributed among critical path lengths of the seven most dominant DCs, averaged across traces from all benchmarks. As expected, the critical path of the first dominant DCs are longer than that of the others. Hence, while the most dominant DC is executed in a wide cluster, all others may be sequentially scheduled on one or more narrow clusters, as the combined path length usually does not exceed that of the dominant DC. The critical path length of first dominant DCs approximately scales as a square root of the length of traces constructed.

Figure 14:
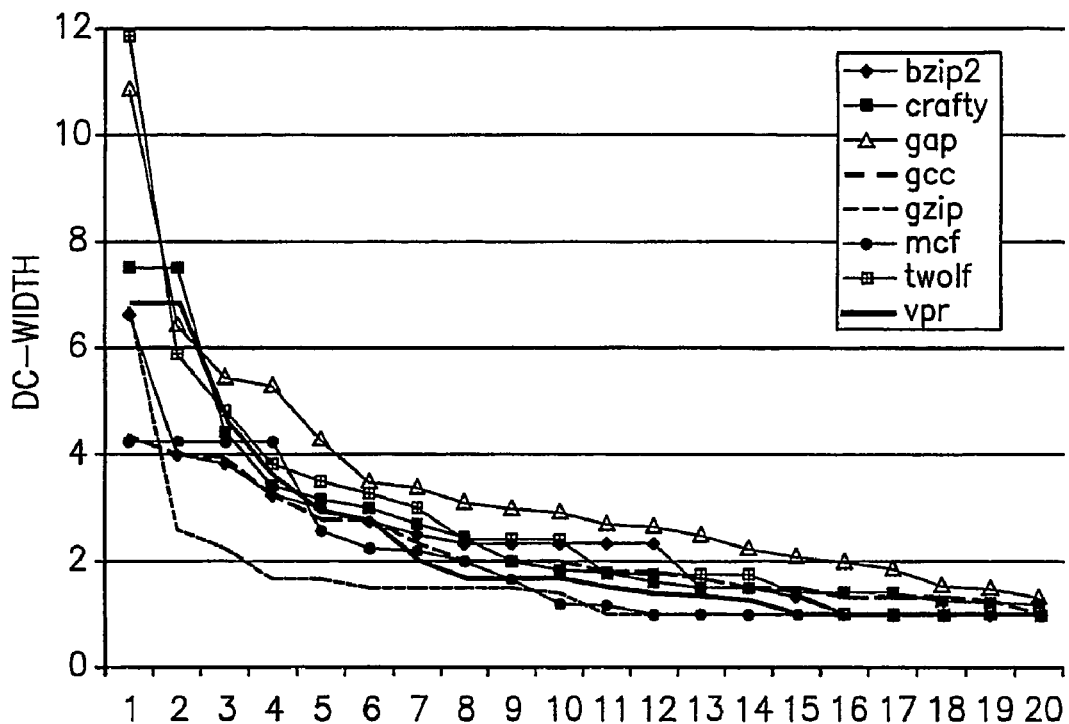
FIG. 14 is a schematic illustration of a graph showing DC-width distribution of first dominant DCs of twenty most frequently executed traces before applying a DC optimization algorithm according to embodiments of the invention.

FIG. 14 is a schematic graph showing the DC-width distribution of first dominant DCs of the twenty most frequently executed traces sorted according to their DC-width, for the eight benchmarks described above. It shows that in some cases, the DC-width of the dominant DC may go up to a maximum of twelve.

Figure 15:
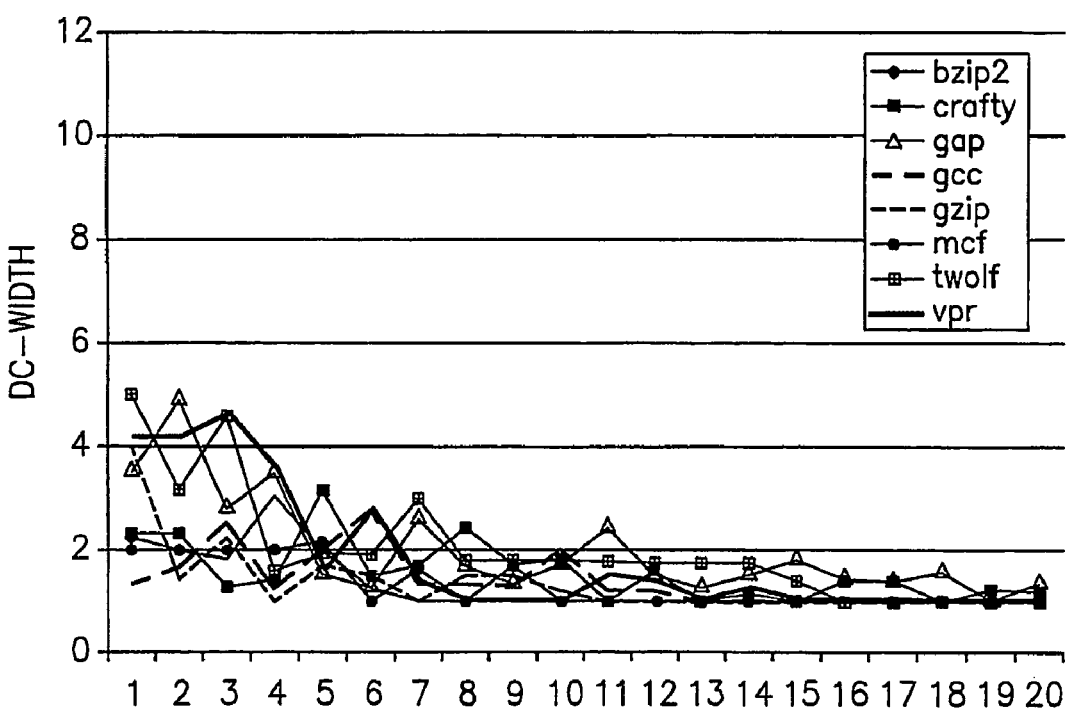
FIG. 15 is a schematic illustration of a graph showing DC-width distribution of the first dominant DCs of the twenty frequently executed traces of FIG. 14, after applying a DC optimization algorithm according to embodiments of the invention.

FIG. 15 is a schematic graph showing the DC-width distribution of the first dominant DCs of the twenty frequently executed traces, after applying the DC optimization procedure based upon an instruction duplication algorithm, compared with DC-width distribution shown in FIG. 14, in accordance with exemplary embodiments of the invention. The DC-width is significantly reduced, and in most of cases, the DC-width is equal to or less than two.

Figure 16:
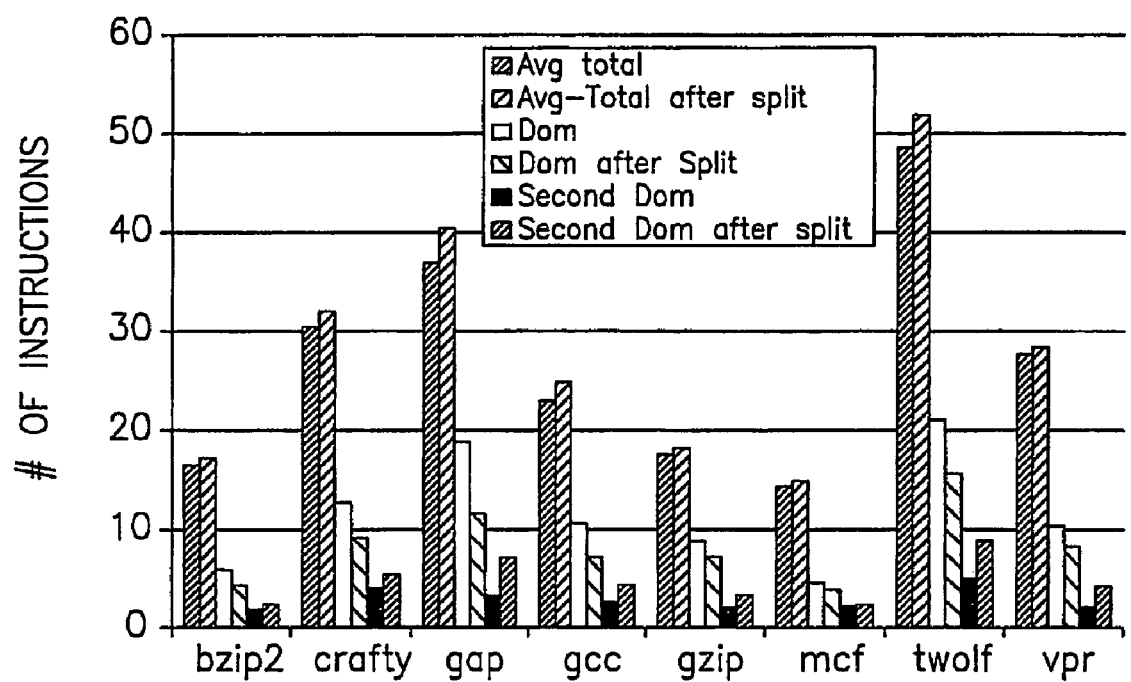
FIG. 16 is a schematic illustration of a graph demonstrating a reduction in size by the number of instructions in the dominant DCs after applying a DC optimization algorithm according to embodiments of the invention.

FIG. 16 is a schematic graph showing the effectiveness of the instruction duplication algorithm, as disclosed in this application, in terms of reducing the number of instructions in the first dominant DCs averaged across all traces of a benchmark. The first bar is the average number of total instructions in a trace. The second bar shows the increase in this average number as a result of additional instructions duplicated. However, this increase in the number of instruction due to duplication is less than 10% of the total instructions in the traces. The next two bars show the number of instructions in the dominant DC before and after the optimization of dominant DC, respectively. On an average about 20% of the size of the dominant DC has been reduced. The last two bars show the number of instructions in the second dominant DC before and after the application of optimization algorithm. The number of instructions in the second dominant DC increases because a DC resulting from the split of the original first dominant DC may become the new second dominant DC.

The complexity effectiveness of DCP micro-architecture, as is disclosed in this application, is compared with Instruction Level Distributed Processing (ILDP) micro-architecture, and other clustered out-of-order (OOO) and in-order micro-architecture. The results are summarized in the following Table 2.

TABLE 2

| | 6-way In-order superscalar | DCP | ILDP | 6-way OOO superscalar |
|---|---|---|---|---|
| Decode bandwidth | 6-wide | Maximum 3-wide | 4-wide | 6-wide |
| Rename bandwidth | NONE | NONE | 4 read/write ports to Map table | 18 read/write port to map table |
| Steering Logic | NONE | NONE | Accumulator based | Complex dependence-based if clustered) |
| Issue Logic | In-order | In-order | In-order | 6-way out-of-order, Issue Q: Integer: 32 FP: 32 |
| Register File | 128 entry with 6 write and 12 read ports | 128 entry global register file with 2 read/2 write ports Small local register file per cluster to hold intermediate values | 128 entry global register file with 1 read/2 write ports, and is replicated in each cluster One accumulator per cluster | 128 entry with 6 write and 12 read ports |
| Bypasses | Equivalent to 6-wide machine | Equivalent to 3-wide machine | Equivalent to 1-wide machine | Equivalent to 6-wide machine |
| ROB | NONE | NONE | 128 entries | 128 entries |
| Instruction Cache | I-Cache | I-cache, DC-cache | I-cache | I-cache |

As is clear from the table, DCP micro-architecture disclosed in this application does not have the complexity of renaming and steering logic but could still obtain some of the benefits of out-of-order execution as the instructions are pre-scheduled and renamed while constructing the trace. Also as explained above with reference to FIG. 2, a re-order buffer (ROB), which is used to save register values for use in situations where re-execution of instructions of a trace becomes necessary, may not be needed, e.g., compared to ILDP and out-of-order processors. Compared with a baseline design of 6-wide in-order clusters, DCP has less complex bypass logic as it uses at most 3-wide clusters. Other studies noted that complexity of bypass logic increases quadratically with respect to increase in issue widths. Also, the global register file used in DCP requires just two read and two write ports for global register file as most of the traffic is handled via local register files. This is a significant reduction in complexity when compared to twelve read and six write ports that are necessary in a conventional in-order monolithic designs to issue 6-instructions in one cycle. Such a complexity effective design may enable high frequency implementations.

Figure 17:
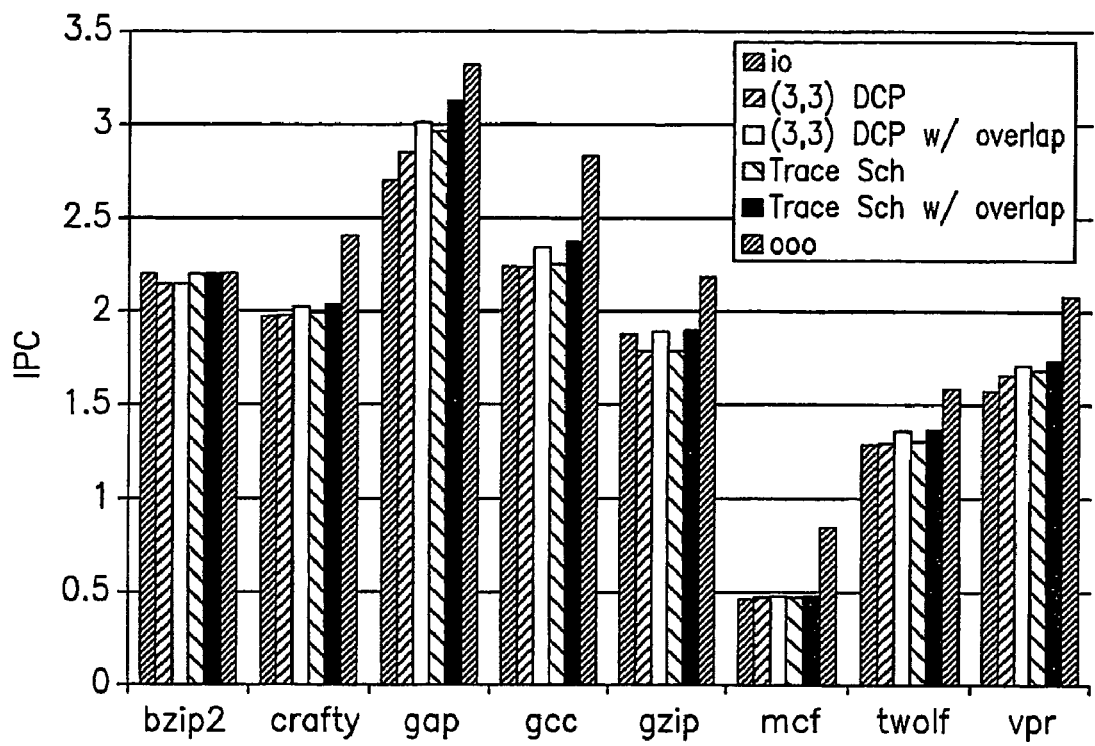
FIG. 17 is a schematic illustration of a graph showing instructions per cycle (IPC) of a DCP micro-architecture according to embodiments of the invention compared to IPC of conventional in-order and out-of-order processors.

FIG. 17 is a schematic graph comparing performance of instructions per cycle (IPC) of a DCP micro-architecture with two 3-wide in-order pipeline clusters, denoted "(3,3) DCP", with a baseline 6-wide in-order processor with support to execute optimized traces, denoted "Trace Sch"; with an in-order processor, denoted "io"; and with an out-of-order processor, denoted "ooo". It is noted from FIG. 17 that the baseline 6-wide in-order processor of "Trace Sch" achieves higher IPC compared to the IPC achieved by the in-order processor of "io". The performance improvement may be up to 15% for a particular benchmark of "gap". It is also noted that DCP micro-architecture with two 3-wide in-order clusters, e.g., "(3,3) DCP", may achieve an IPC substantially equivalent to the IPC of "Trace Sch". This performance benefit may be the result of scheduling over long traces and uniform instruction distribution among clusters achieved through optimized DC construction algorithm.

Compared with serialized execution of traces wherein execution of one trace is completed before next trace may be issued to the clusters, performance improvement by about 10-15% was also achieved in overlapped execution of adjacent traces, based on a controlled speculation approach. The results are shown in FIG. 17 as "(3,3) DCP w/overlap". The controlled speculation approach managed the execution of DCs, so that while execution of DCs from the current trace was still underway, the trace predictor selected a next trace to be executes. DCs in the selected trace may be executed in the already available cluster resource, since it is assumed they might not have data dependency with DCs currently being executed.

Figure 18:
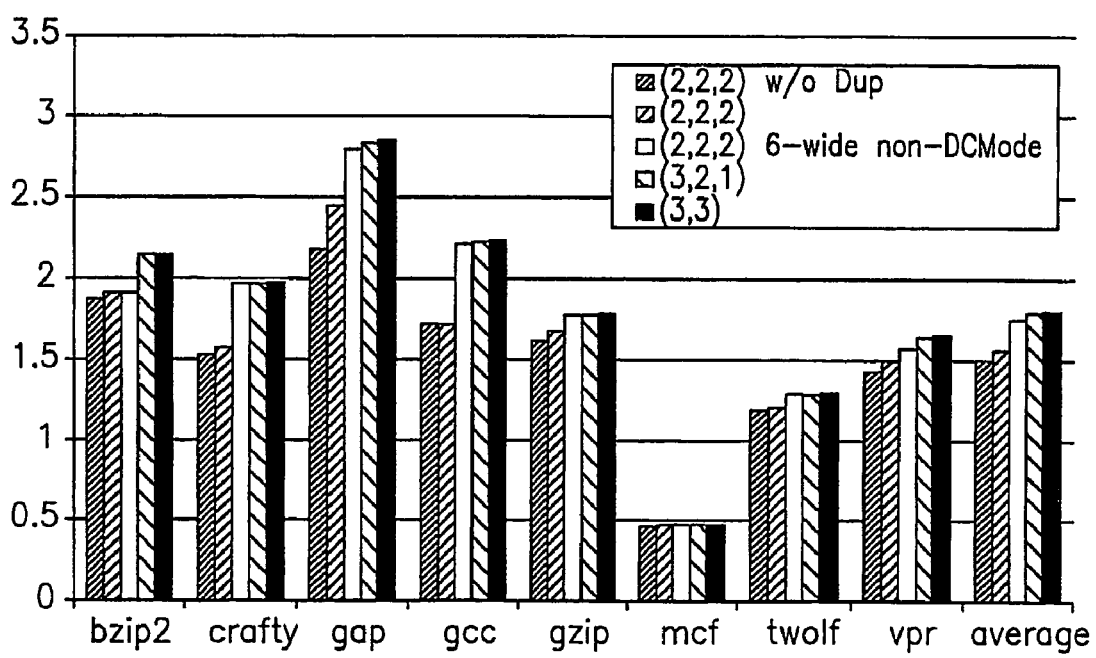
FIG. 18 is a schematic illustration of a graph showing performance comparison as measured by IPC between a heterogeneous DCP micro-architecture and a homogeneous DCP micro-architecture according to exemplary embodiments of the invention.

Performance comparisons, measured by IPC, were made between homogeneous and heterogeneous DCP micro-architectures as well. FIG. 18 is a schematic graph showing results among three different cluster configurations, denoted as (3,3), (3,2,1), and (2,2,2), having the same total issue-width. A configuration of (3,3) had two 3-wide clusters; a configuration of (3,2,1) had three clusters of sizes 3-wide, 2-wide, and 1-wide; and a configuration of (2,2,2) had three 2-wide clusters.

DCP micro-architecture with a (3,2,1) cluster configuration had almost the same performance as a (3,3) configuration. This is consistent with the characterization of DCs. Since there may be only one dominant DC with a high DC-width, only one wide cluster that executes this dominant DC may be required in order to maximize available ILP.

DCP micro-architecture with heterogeneous cluster configuration has some advantages over homogeneous cluster configuration. A (3,2,1) configuration may require less area than a (3,3) configuration because a (3,2,1) configuration may use smaller bypass network logic. As a result, a (3,2,1) configuration may also consume less energy by turning off clusters when only limited ILP is available. Performance may also be improved by designing variable length pipelines as narrower pipelines may be smaller in depth and may be clocked faster.

On the other hand, a (3,3) configuration may be easier to design, through replicating an existing 3-wide cluster, than a (3,2,1) configuration, which may require the design of essentially three pipelines with three different widths.

FIG. 18 also compares the (3,3) configuration with the (2,2,2). In the non-DC mode, all the instructions were executed in the widest available cluster. Thus, in the (2,2,2) configuration in non-DC mode, instructions were executed in a 2-wide pipeline that resulted in performance degradation. FIG. 18 also shows the performance advantage resulting from using the instruction duplication algorithm. A first bar in FIG. 18 corresponds to the (2,2,2) configuration simulated without applying instruction duplication algorithm. For benchmark "gap", an improvement in IPC of up to 13% was achieved. On average, the improvement was around 5%.

Figure 19:
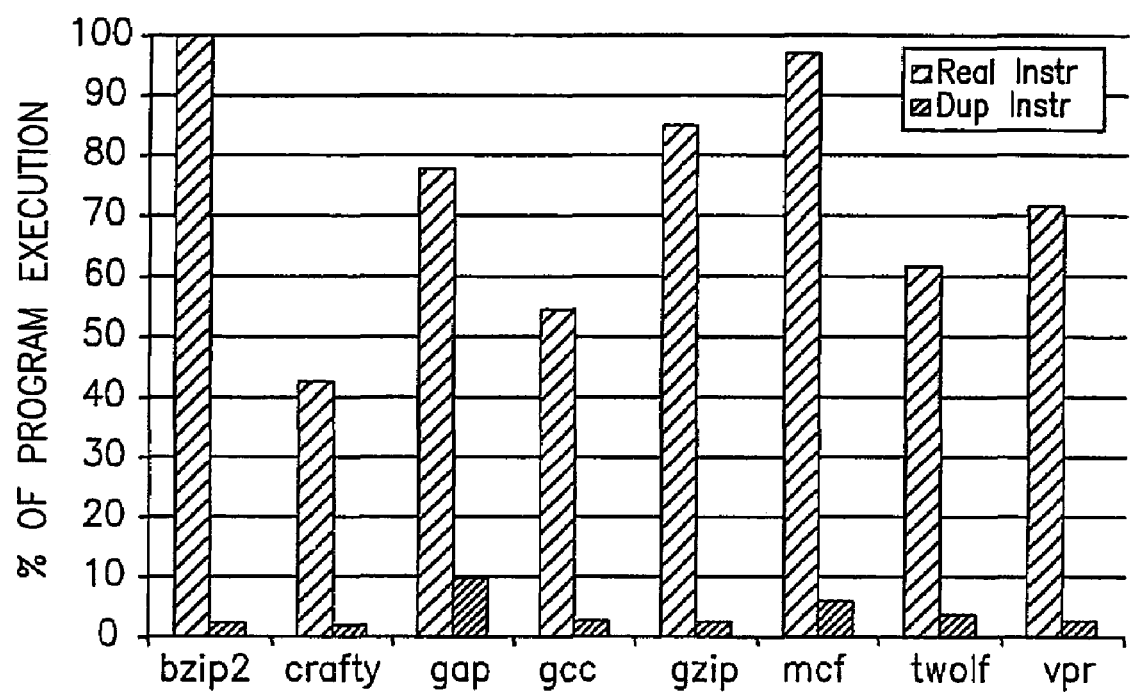
FIG. 19 is a schematic illustration of a graph showing the percentage of dynamic number of instructions of overall program instructions executed in a DC mode and the percentage of dynamic number of instructions duplicated.

FIG. 19 is a schematic graph showing the percentage of dynamic instructions that were executed in the DC mode. The DC mode was the same for all three configurations as in FIG. 18, namely, configuration (3,3), configuration (3,2,1), and configuration (2,2,2). It also shows the percentage of dynamic number of duplicate instructions, which was about 4% on average and implies that overhead incurred due to duplicated instructions was very minimal.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method comprising:
   splitting a dependency chain into a set of reduced-width dependency chains, wherein splitting said dependency chain comprises:
   determining a plurality of splitting scenarios of said dependency chain, wherein the reduced-width dependency chains correspond to a set of instructions and wherein the set of instructions are to be stored in a memory, wherein an instruction execution trace is to be converted into a string of stream identifiers; and
   compressing the string of stream identifiers to generate a directed acyclic graph, wherein one or more frequently recurrent sequences of stream identifiers, corresponding to the set of reduced-width dependency chains, are to be determined based on the directed acyclic graph.

2. The method of claim 1, wherein splitting said dependency chain comprises:
   obtaining one or more weighted index values related to one or more of said splitting scenarios, respectively; and
   dividing said dependency chain into said set of reduced-width dependency chains according to a splitting scenario from the plurality of splitting scenarios which is related to the largest of said weighted index values.

3. The method of claim 2, comprising iteratively repeating said laying out, said obtaining, and said dividing on a widest dependency chain of said set of reduced-width dependency chains until the largest of said weighted index values related to splitting said widest dependency chain is smaller than a pre-defined value.

4. The method of claim 2, wherein obtaining said one or more weighted index values comprises:
   calculating an index value related to said splitting scenario;
   determining a weighting factor based on splitting a widest dependency chain of said set of reduced-width dependency chains; and
   applying a sum of said index value and said weighting factor to said weighted index value.

5. The method of claim 4, wherein determining said weighting factor comprises:
   computing one or more index values related to one or more, respective, possible splits of said widest dependency chain; and
   applying the largest of said index values to said weighting factor.

6. The method of claim 5, wherein said computing comprises subtracting the number of duplicated instructions among a set of reduced-width dependency chains of said widest dependency chain from the number of instructions that are not duplicated in one of said set of reduced-width dependency chains having the smallest number of instructions.

7. The method of claim 4, wherein said calculating comprises subtracting the number of duplicated instructions among said set of reduced-width dependency chains from the number of instructions that are not duplicated in one of said set of reduced- width dependency chains having the smallest number of instructions.

8. An apparatus comprising:
a processor to split a dependency chain into a set of reduced-width
dependency chains, wherein the processor comprises:
logic to determine a plurality of splitting scenarios of the dependency chain, wherein an instruction execution trace is to be converted into a string of stream identifiers; and
logic to compress the string of stream identifiers to generate a directed acyclic graph, wherein one or more frequently recurrent sequences of stream identifiers, corresponding to the set of reduced-width dependency chains, are to be determined based on the directed acyclic graph.

9. The apparatus of claim 8, wherein said processor is able to divide said dependency chain into said set of reduced-width dependency chains according to a splitting scenario from the plurality of splitting scenarios which is related to a largest weighted index value.

10. The apparatus of claim 9, wherein said processor is able to iteratively repeat said dividing on a widest dependency chain of said set of reduced-width dependency chains until said largest weighted index value is smaller than a pre-defined value.

11. The apparatus of claim 9, wherein said processor is able to calculate an index value related to said splitting scenario, to determine a weighting factor based on splitting of a widest dependency chain of said set of reduced-width dependency chains, and to apply a sum of said index value and said weighting factor to said weighted index value.

12. The apparatus of claim 11, wherein said processor is able to calculate one or more index values related to one or more, respective, possible splits of said widest dependency chain, and to apply the largest of said index values to said weighting factor.

13. The apparatus of claim 12, wherein said processor is able to subtract the number of duplicated instructions among a set of reduced-width dependency chains of said widest dependency chain from the number of instructions that are not duplicated in one of said set of reduced-width dependency chains having the smallest number of instructions.

14. The apparatus of claim 11, wherein said processor is able to subtract the number of duplicated instructions among said set of reduced-width dependency chains from the number of instructions that are not duplicated in one of said set of reduced-width dependency chains having the smallest number of instructions.

15. A computing platform comprising:
a processor to split a dependency chain of a set of target instructions into a set of reduced-width dependency chains wherein the processor is to determine a plurality of splitting scenarios of the dependency chain; and
a memory to store said set of target instructions, wherein an instruction execution trace is to be converted into a string of stream identifiers, wherein the string of stream identifiers are to be compressed to generate a directed acyclic graph and wherein one or more frequently recurrent sequences of stream identifiers, corresponding to the set of reduced-width dependency chains, are to be determined based on the directed acyclic graph.

16. The computing platform of claim 15, wherein said processor is able to divide said dependency chain into said set of reduced-width dependency chains according to a splitting scenario from the plurality of splitting scenarios which is related to a largest weighted index value.

17. The computing platform of claim 16, wherein said processor is able to iteratively repeat dividing said dependency chain on a widest dependency chain of said set of reduced-width dependency chains.

18. The computing platform of claim 16, wherein said processor is able to calculate an index value related to said splitting scenario, to determine a weighting factor based on splitting a widest dependency chain of said set of reduced-width dependency chains, and to apply a sum of said index value and said weighting factor to said weighted index value.

19. The computing platform of claim 18, wherein said processor is able to calculate one or more index values related to one or more, respective, possible splits of said widest dependency chain, and to apply to said weighting factor the largest of the index values related to said one or more possible splits.

20. A program storage device having instructions readable by a machine that when executed by the machine result in:
splitting a dependency chain into a set of reduced-width dependency chains, wherein splitting said dependency chain comprises:
determining a plurality of splitting scenarios of said dependency chain, wherein an instruction execution trace is to be converted into a string of stream identifiers; and
compressing the string of stream identifiers to generate a directed acyclic graph, wherein one or more frequently recurrent sequences of stream identifiers, corresponding to the set of reduced-width dependency chains, are to be determined based on the directed acyclic graph.

21. The program storage device of claim 20, wherein the instructions resulting in splitting said dependency chain result in dividing said dependency chain into said set of reduced-width dependency chains according to a splitting scenario from the plurality of splitting scenarios which is related to a largest weighted index value.

22. The program storage device of claim 21, wherein the instructions resulting in splitting said dependency chain result in iteratively repeating said dividing until said largest weighted index value is smaller than a pre-defined value.

* * * * *

UNITED STATES PATENT AND TRADEMARK OFFICE
CERTIFICATE OF CORRECTION

PATENT NO. : 7,603,546 B2
APPLICATION NO. : 10/950693
DATED : October 13, 2009
INVENTOR(S) : Narayanasamy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1075 days.

Signed and Sealed this

Fourteenth Day of December, 2010

David J. Kappos
*Director of the United States Patent and Trademark Office*